(12) United States Patent
Cao et al.

(10) Patent No.: US 11,701,989 B2
(45) Date of Patent: Jul. 18, 2023

(54) REVERSIBLE HEADREST

(71) Applicant: Yanfeng International Seating Systems Co., LTD., Shanghai (CN)

(72) Inventors: Yaowei Cao, Shanghai (CN); Min Zhu, Shanghai (CN); Xia Li, Shanghai (CN); Donghai Xu, Shanghai (CN)

(73) Assignee: YANFENG INTERNATIONAL SEATING SYSTEMS CO., LTD., Shanghai (CN)

( * ) Notice: Subject to any disclaimer, the term of this patent is extended or adjusted under 35 U.S.C. 154(b) by 63 days.

(21) Appl. No.: 17/600,007

(22) PCT Filed: Mar. 6, 2020

(86) PCT No.: PCT/CN2020/078185
§ 371 (c)(1),
(2) Date: Sep. 29, 2021

(87) PCT Pub. No.: WO2020/220826
PCT Pub. Date: Nov. 5, 2020

(65) Prior Publication Data
US 2022/0105844 A1 Apr. 7, 2022

(30) Foreign Application Priority Data
Apr. 28, 2019 (CN) .......................... 201910350795.1

(51) Int. Cl.
*B60N 2/841* (2018.01)
*B60N 2/856* (2018.01)

(52) U.S. Cl.
CPC ............. *B60N 2/841* (2018.02); *B60N 2/856* (2018.02)

(58) Field of Classification Search
None
See application file for complete search history.

(56) References Cited

U.S. PATENT DOCUMENTS 5,498,062 A * 3/1996 Holdampf ............ B60N 2/3084
297/14
11,148,569 B2 * 10/2021 Xu .......................... B60N 2/856
(Continued)

FOREIGN PATENT DOCUMENTS

CN 200971065 A 11/2007
CN 108016338 A 5/2018
(Continued)

*Primary Examiner* — David E Allred
(74) *Attorney, Agent, or Firm* — BakerHostetler

(57) ABSTRACT

A turnable headrest includes a headrest body and a headrest rod. The headrest body is wrapped around and hinged to a horizontal rod of the headrest rod, and two vertical rods of the headrest rod are inserted into a seat. The turnable headrest further includes a fixed tooth, a torsion spring, a rotary tooth, and a reset tension spring. A headrest body locking portion, a headrest body rotary tooth portion, and a turned headrest body locking portion are disposed on the fixed tooth. A rotary tooth portion is disposed on the rotary tooth. When the rotary tooth portion is mated with the headrest body locking portion on the fixed tooth, the headrest body is locked at an initial use position. When the rotary tooth portion is mated with the headrest body rotary tooth portion on the fixed tooth, the headrest body is at a turnable position. When the rotary tooth portion is mated with the turned headrest body locking portion on the fixed tooth, the headrest body is locked at a flat position. The turnable headrest has advantages such as a strong self-locking ability, a small quantity of parts, a simple structure, and low costs.

8 Claims, 14 Drawing Sheets

(56) References Cited

U.S. PATENT DOCUMENTS

| | | | | |
|---|---|---|---|---|
| 2009/0102266 A1* | 4/2009 | Furukawa | ............... | B60N 2/856 |
| | | | | 297/391 |
| 2011/0084534 A1 | 4/2011 | Sohn | | |
| 2011/0254339 A1* | 10/2011 | Bruck | .................... | B60N 2/856 |
| | | | | 297/403 |
| 2013/0207438 A1* | 8/2013 | Akyildiz | ................ | B60N 2/874 |
| | | | | 297/403 |
| 2015/0367764 A1* | 12/2015 | Laperriere, III | ....... | B60N 2/847 |
| | | | | 297/408 |
| 2017/0182916 A1* | 6/2017 | Yamane | ................. | B60N 2/859 |
| 2018/0111521 A1* | 4/2018 | Imayou | ................. | B60N 2/844 |
| 2020/0384903 A1 | 12/2020 | Xu et al. | | |
| 2021/0162903 A1* | 6/2021 | Little | .................... | B60N 2/865 |

FOREIGN PATENT DOCUMENTS

| | | | |
|---|---|---|---|
| CN | 108394328 A | | 8/2018 |
| CN | 110293888 A | | 10/2019 |
| JP | 06297989 A | * | 10/1994 |
| KR | 101910941 B1 | * | 10/2018 |
| WO | 2015158666 A1 | | 10/2015 |
| WO | 2020220826 A1 | | 11/2020 |

* cited by examiner

REVERSIBLE HEADREST

CROSS-REFERENCE TO RELATED APPLICATIONS

This application claims priority of International Patent Application No. PCT/CN2020/078185, filed on Mar. 6, 2020, which claims priority of Chinese Patent Application No. 201910350795.1, filed Apr. 28, 2019, the disclosure of which are incorporated by reference in their entirety.

TECHNICAL FIELD

The present invention relates to the technical field of seat headrests, and in particular, to a turnable or reversible headrest.

BACKGROUND

A headrest of an automobile seat is a device disposed for enhancing the comfort and safety of automobiles. An ordinary headrest of the automobile seat only has a function of adjusting heights, and therefore such a seat may impede the view of passengers at back rows to make the passengers at the back rows feel repressed, and may also block the sight of a driver to observe rear vehicles.

Therefore, the applicant submitted a utility model application of a turnable headrest to the National Intellectual Property Administration, PRC on Nov. 24, 2006 with the application No. CN200971065Y. The patent includes headrest foam, headrest rods, and a headrest guide sleeve. Upper ends of the headrest rods are fixed to the headrest foam, lower ends of the headrest rods extend through the headrest guide sleeve. Turnable locking notches are disposed on the lower ends of the headrest rods. The headrest guide sleeve includes a guide sleeve body, a pin shaft is disposed in the guide sleeve body, a turnable member extends through the pin shaft, and a locking member is disposed in the turnable member that is mated and locked with the turnable locking notches. When the headrest foam is pulled to the highest position, the guide sleeve is configured to prevent the rod from disengaging and turn the headrest foam forward, thereby providing better view for the passengers at the back rows.

Since the publication of the patent, seats having turnable headrests have been successively invented in the industry. However, the turnable headrests used on these seats have complex structures and high manufacturing costs, and are unreliable in locking under the action of an external force.

Afterwards, the applicant submitted a utility patent application of a turnable mechanism to the China National Intellectual Property Administration, PRC on Nov. 29, 2017 with the application No. CN108016338A. The turnable mechanism includes: a support assembly; a rotatable cam, axially disposed on the support assembly; a cam resetting element, connected to the cam and the support assembly; a locking pawl piece, axially disposed on the support assembly, the cam being configured to drive the locking pawl piece to switch between a locked state and an unlocked state through forward and reverse movement; a rotary shaft, axially disposed on the support assembly, where a locking tooth plate is disposed on the rotary shaft, the locking pawl piece is in the locked state, and locking pawls in the locking pawl piece are locked and meshed with locking slots on the locking tooth plate, so that the rotary shaft and the support assembly can be prevented from rotating relative to each other by using the locking tooth plate, and when the locking pawl piece is at an unlocked position, the locking pawls in the locking pawl piece are unlocked and meshed with the locking slots on the locking tooth plate, and the rotary shaft and the support assembly are rotatable relative to each other; and a rotary shaft resetting torsion spring, connected to the tooth plate and the support assembly, where the rotary shaft resetting torsion spring is configured to drive the locking tooth plate and the rotary shaft to rotate relative to the support assembly.

In addition, the turnable automobile seat headrests have the similar design of structure, which are all formed by headrest frames, turnable housing core members, and unlocking mechanisms. However, the seat headrests all have risks of automatic unlocking when automobiles are seriously impacted from the front or rear, which cannot meet requirements of passengers for safety. Further, existing turnable headrests all have complex structures and high costs.

SUMMARY

The present invention is intended to provide a turnable headrest having good safety, a simple structure, and low costs, so as to resolve a technical problem of the risk of automatic unlocking, complex structures, and high costs of existing turnable headrests when the automobiles are seriously impacted from the front or rear.

The technical problem to be solved by the present invention may be implemented by using the following technical solutions.

A turnable headrest includes a headrest body and a headrest rod, where the headrest body is wrapped around and hinged to a horizontal rod of the headrest rod, and two vertical rods of the headrest rod are inserted into a seat, the turnable headrest further including:

a fixed tooth, fixed to the horizontal rod of the headrest rod and located in the headrest body, where a headrest body locking portion, a headrest body rotary tooth portion, and a turned headrest body locking portion are disposed on the fixed tooth;

a torsion spring, sleeved on the horizontal rod of the headrest rod and located in the headrest body, where one end of the torsion spring acts on the fixed tooth, and an other end of the torsion spring acts on the headrest body;

a rotary tooth, axially disposed in the headrest body, where the rotary tooth has a rotary tooth portion, when the rotary tooth portion is mated with the headrest body locking portion on the fixed tooth, the headrest body is locked at an initial use position, when the rotary tooth portion is mated with the headrest body rotary tooth portion on the fixed tooth, the headrest body is at a turnable position, and when the rotary tooth portion is mated with the turned headrest body locking portion on the fixed tooth, the headrest body is locked at a flat position; and an elastic reset element, where one end of the elastic reset element acts on the rotary tooth, an other end of the elastic reset element acts on the headrest body, and the elastic reset element is configured to push the rotary tooth portion on the rotary tooth such that a specific contact pressure always exists between the rotary tooth portion on the rotary tooth and the headrest body locking portion, the headrest body rotary tooth portion, and the turned headrest body locking portion on the fixed tooth.

In an exemplary embodiment of the present invention, the headrest body rotary tooth portion is located between the headrest body locking portion and the turned headrest body locking portion.

In an exemplary embodiment of the present invention, the headrest body locking portion is formed by a sector-shaped notch, the sector-shaped notch is formed by a convex circular arc and a first locking straight side and a locking concave arc side that are located on two ends of the convex circular arc, the first locking straight side is adjacent to the headrest body rotary tooth portion, the first locking straight side and the locking concave arc side form a first locking concave corner, the headrest body rotary tooth portion is formed by a convex circular arc, one end of the convex circular arc is connected to the first locking straight side, the turned headrest body locking portion is formed by a second locking concave corner formed by a straight side and an other end of the convex circular arc, the rotary tooth portion is composed of a first locking arc, a slidably mated concave arc, and a second locking arc, one end of the first locking arc is connected to one end of the slidably mated concave arc, and the second locking arc is connected to an other end of the slidably mated concave arc to form a locking convex corner with the other end of the slidably mated concave arc;

when the headrest body is locked in a use state, the locking convex corner in the rotary tooth portion is inserted into the first locking concave corner in the headrest body locking portion, the second locking arc is in locked contact with the first locking straight side, and the first locking arc is in locked contact with the locking concave arc side;

when the rotary tooth is unlocked, the locking convex corner in the rotary tooth portion gradually escapes from the first locking concave corner in the headrest body locking portion until complete escape, the second locking arc gradually escapes from the locked contact with the first locking straight side until complete escape from the locked contact, and the first locking arc gradually escapes from the locked contact with the locking concave arc side until complete escape from the locked contact;

during the turning of the headrest body, the slidably mated concave arc on the rotary tooth is in slidable contact with the convex circular arc in the headrest body rotary tooth portion;

after the headrest body is turned completely flat, the locking convex corner in the rotary tooth portion is inserted into the second locking concave corner in the turned headrest body locking portion, and the second locking arc in the rotary tooth portion is in locked contact with the straight side in the turned headrest body locking portion; and when the headrest body needs to return to the use state after being turned completely flat, the rotary tooth is first unlocked, the locking convex corner in the rotary tooth portion gradually escapes from the second locking concave corner in the turned headrest body locking portion until complete escape, and the second locking arc in the rotary tooth portion gradually escapes from the locked contact with the straight side in the turned headrest body locking portion until complete escape from the locked contact.

In an exemplary embodiment of the present invention, the turnable headrest further includes a rotary shaft disposed in the headrest body, and the rotary tooth is fixed to the rotary shaft.

In an exemplary embodiment of the present invention, the turnable headrest further includes an unlocking handle fixed to the rotary shaft, where the elastic reset element is a reset tension spring, one end of the reset tension spring acts on the unlocking handle, an other end of the reset tension spring acts on the unlocking handle and indirectly acts on the rotary tooth by using the unlocking handle and the rotary shaft, and the reset tension spring drives, by using the unlocking handle and the rotary shaft, the rotary tooth to rotate.

In an exemplary embodiment of the present invention, the turnable headrest further includes an unlocking mechanism configured to drive the rotary tooth to rotate for unlocking.

In an exemplary embodiment of the present invention, the unlocking mechanism is an unlocking pull strap, one end of the unlocking pull strap is connected to the rotary tooth, and an other end of the unlocking pull strap extends out from a proper position of the headrest body, and by pulling the unlocking pull strap to rotate, the rotary tooth is driven for unlocking.

In an exemplary embodiment of the present invention, the headrest body is formed by a front half of the headrest and a rear half of the headrest, an unlocking pull strap extension hole is formed on the rear half of the headrest, and the unlocking pull strap extends out of the rear half of the headrest through the unlocking pull strap extension hole.

By means of the above technical solutions, when the headrest body is in use, the headrest body is inserted into the first locking concave corner in the headrest body locking portion by using the locking convex corner in the rotary tooth portion to be in locked contact with the second locking arc and the first locking straight side. The first locking arc is in locked contact with the locking concave arc side for self-locking. The headrest body has a strong self-locking ability and has no risks of automatic unlocking when an automobile is seriously impacted from the front or rear.

After the headrest body is turned completely flat, the locking convex corner in the rotary tooth portion is inserted into the second locking concave corner in the turned headrest body locking portion, and the second locking arc in the rotary tooth portion is in locked contact with the straight side in the turned headrest body locking portion for self-locking. The headrest body has a strong self-locking ability and has no risks of automatic unlocking when an automobile is seriously impacted from the front or rear.

During the turning of the headrest body of the present invention, the slidably mated concave arc on the rotary tooth is in slidable contact with the convex circular arc in the headrest body rotary tooth portion, so as to eliminate the gap and achieve flexible turning.

The turnable headrest of the present invention has a small quantity of parts, a simple structure, and low costs.

DETAILED DESCRIPTION

The following further describes the present invention with reference to the accompanying drawings and specific implementations.

Figure 1:
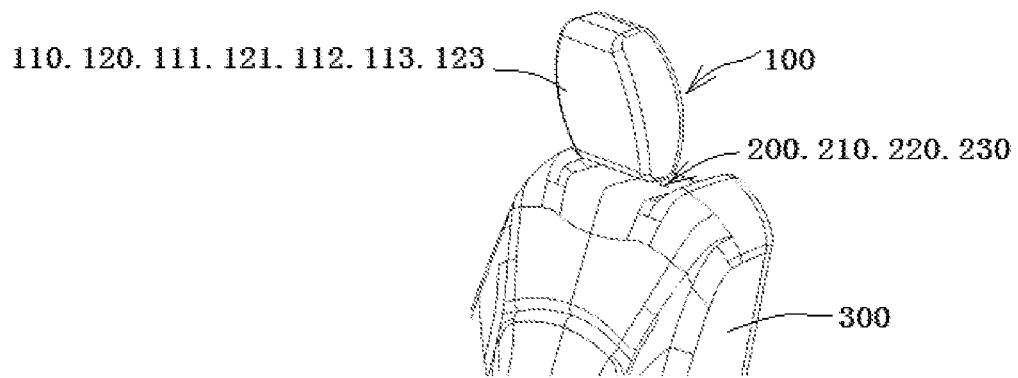
FIG. 1 is a schematic diagram of a turnable headrest in a normal use state according to the present invention.
Figure 2:
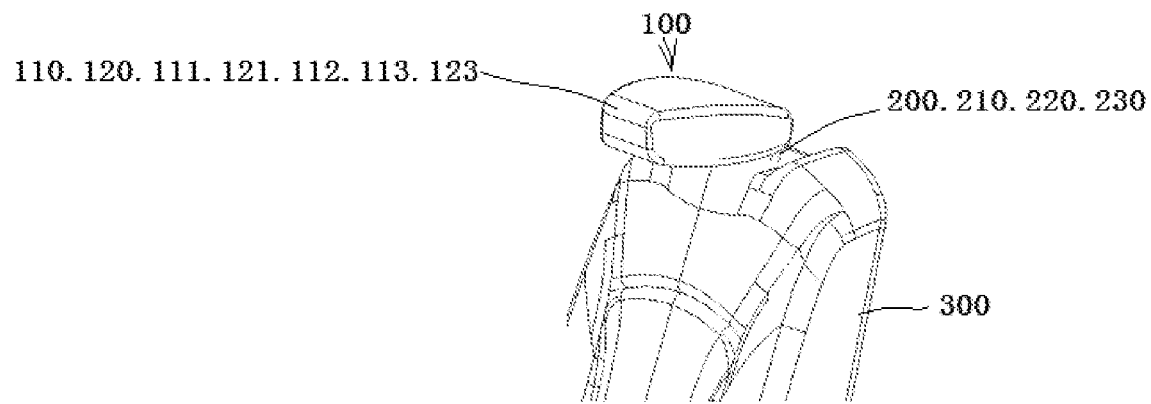
FIG. 2 is a schematic diagram of a state of the turnable headrest turned completely flat according to the present invention.
Figure 3:
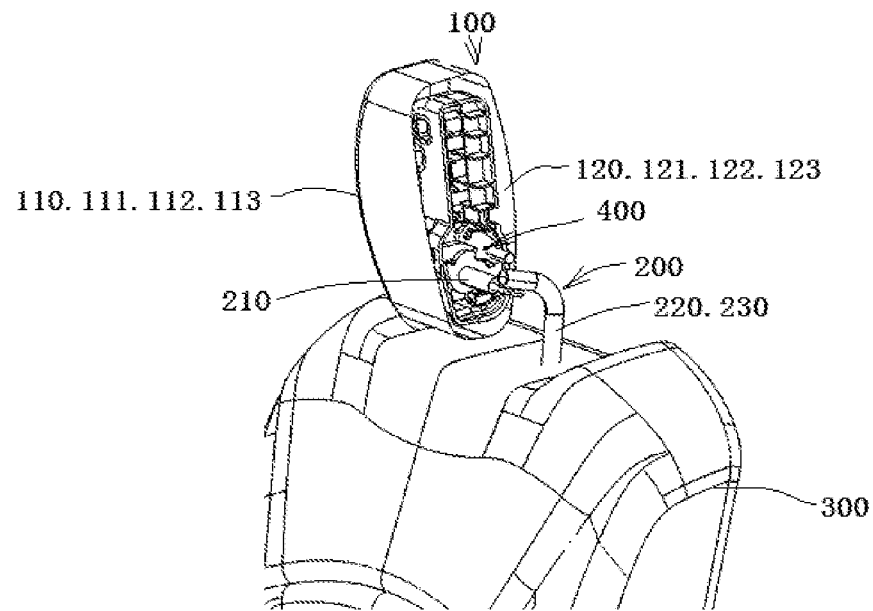
FIG. 3 is a schematic diagram of an internal structure of the turnable headrest according to the present invention.
Figure 4:
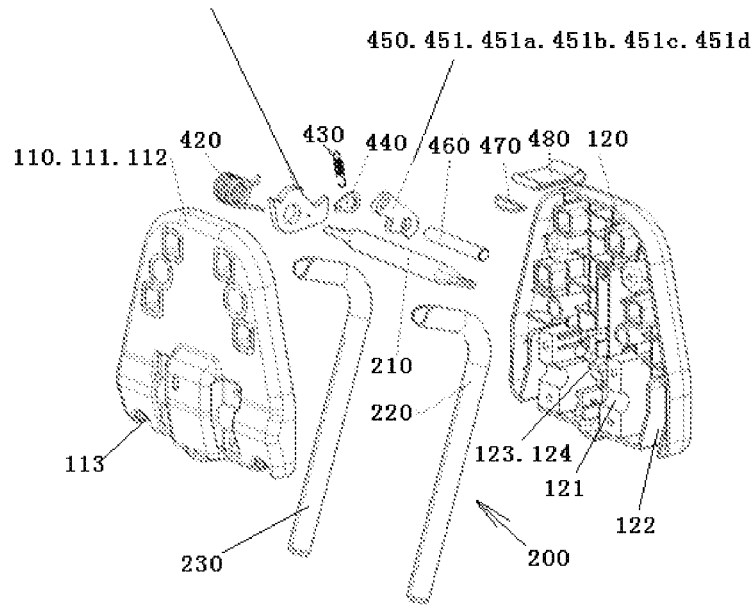
FIG. 4 is a schematic exploded view of the turnable headrest viewed from one direction according to the present invention.
Figure 5:
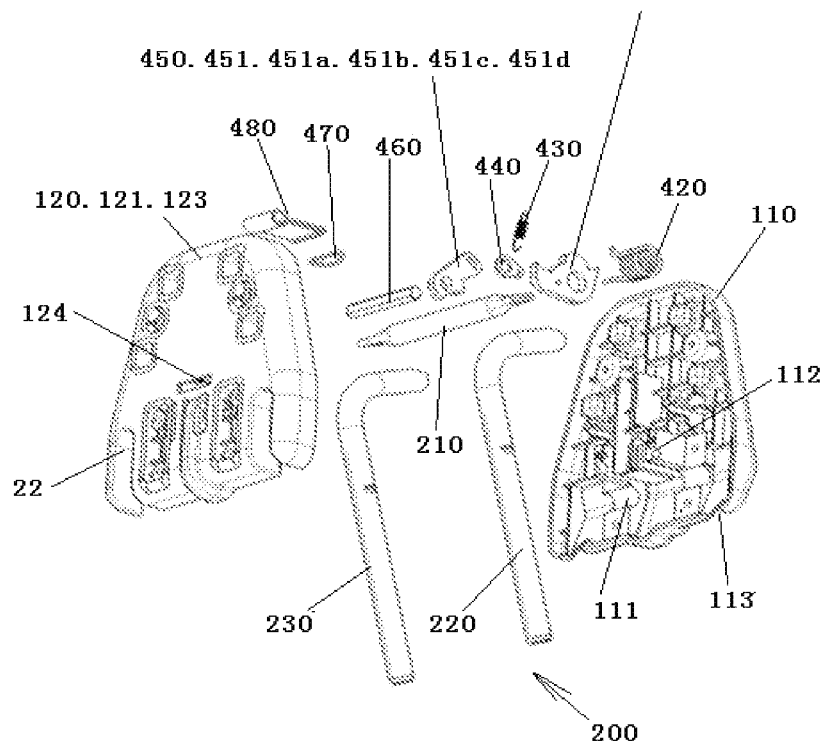
FIG. 5 is a schematic exploded view of the turnable headrest viewed from another direction according to the present invention.
Figure 6:
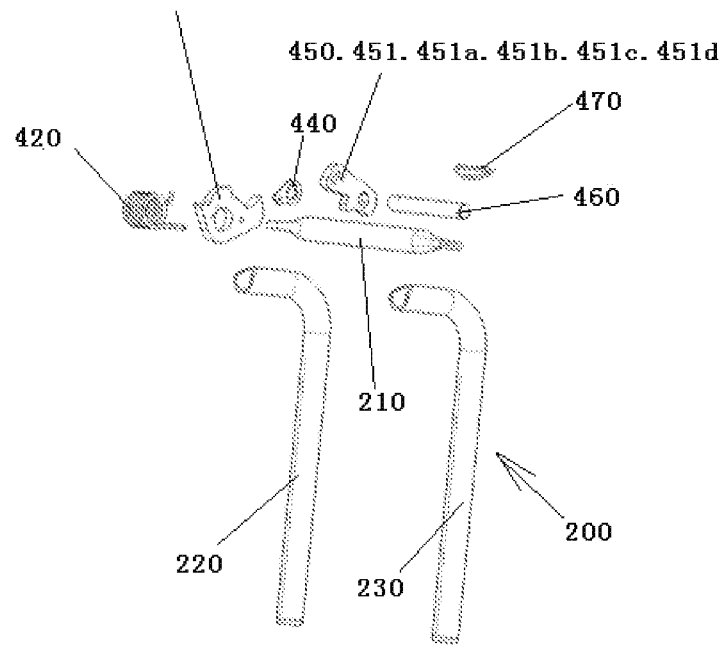
FIG. 6 is a schematic exploded view of the turnable headrest viewed from one direction after a headrest body is removed according to the present invention.
Figure 7:
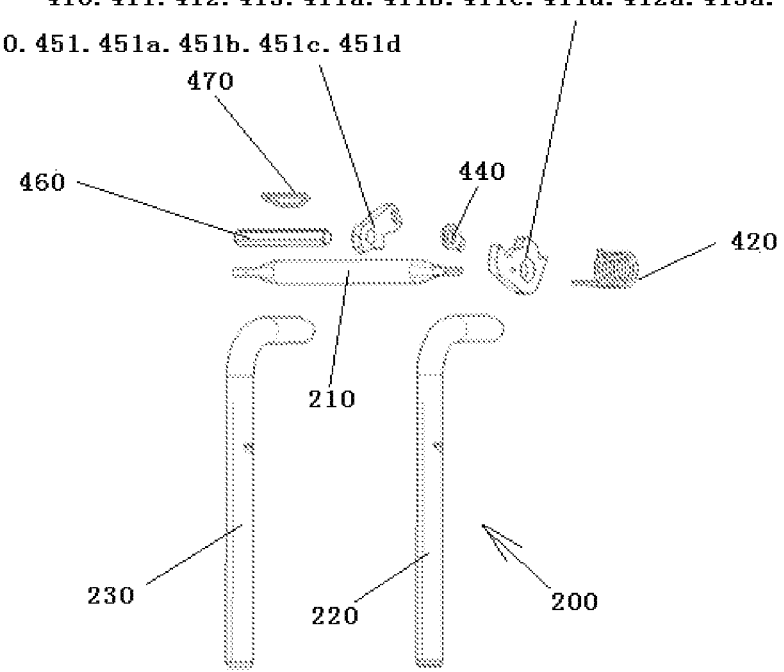
FIG. 7 is a schematic exploded view of the turnable headrest viewed from another direction after the headrest body is removed according to the present invention.

Referring to FIG. 1 to FIG. 3, a turnable headrest includes a headrest body 100 and a headrest rod 200.

The headrest rod 200 is basically the same as that in the prior art, and also includes a horizontal rod 210 and two vertical rods 220 and 230. A left end and a right end of the horizontal rod 210 are connected to upper ends of the vertical rods 220 and 230 by means of integrated molding or welding.

The headrest body 100 is basically the same as that in the prior art and is formed by a front half 110 of the headrest and a rear half 120 of the headrest that are snap-fitted to each other. Semicircular grooves 111 and 121 for hinging are disposed in the front half 110 of the headrest and the rear half 120 of the headrest. When the front half 110 of the headrest and the rear half 120 of the headrest are snap-fitted on the headrest rod 200, the semicircular groove 111 on the front half 110 of the headrest and the semicircular groove 121 on the rear half 120 of the headrest are hinged on the horizontal rod 210. In this way, the entire headrest body 100 is turnable around the horizontal rod 210. In addition, half holes 112 and 122 for the vertical rods 220 and 230 to extend through are respectively disposed in the front half 110 of the headrest and the rear half 120 of the headrest. After the front half 110 of the headrest and the rear half 120 of the headrest are snap-fitted to each other, the vertical rods 220 and 230 extend out of the headrest body 100 through the half holes 112 and 122.

The headrest body 100 can be mounted to a seat back 300 by inserting the lower ends of the vertical rods 220 and 230 into the seat back 300.

In addition, half cavities 113 and 123 configured to mount a headrest turning and locking-unlocking mechanism are further disposed in the front half 110 of the headrest and the rear half 120 of the headrest. After the front half 110 of the headrest and the rear half 120 of the headrest are snap-fitted to each other, the headrest turning and locking-unlocking mechanism 400 is located in a mounting cavity composed of the half cavities 113 and 123.

Referring to FIGS. 4 to 26, the headrest turning and locking-unlocking mechanism 400 shown in the figures includes a fixed tooth 410, a torsion spring 420, a reset tension spring 430, an unlocking handle 440, a rotary tooth 450, a rotary shaft 460, a steel wire pull ring 470, and an unlocking pull strap 480.

Figure 18:
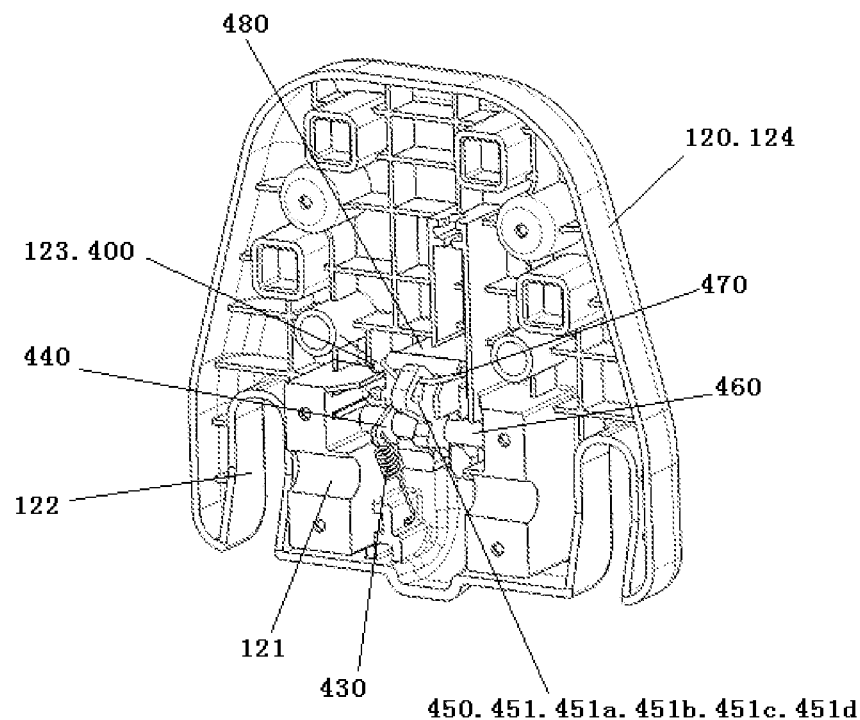
FIG. 18 is a schematic diagram of the unlocking piece, the rotary tooth, the rotary shaft, the unlocking pull strap, and a reset tension spring in the turnable headrest being assembled in a rear half of the headrest according to the present invention.
Figure 19:
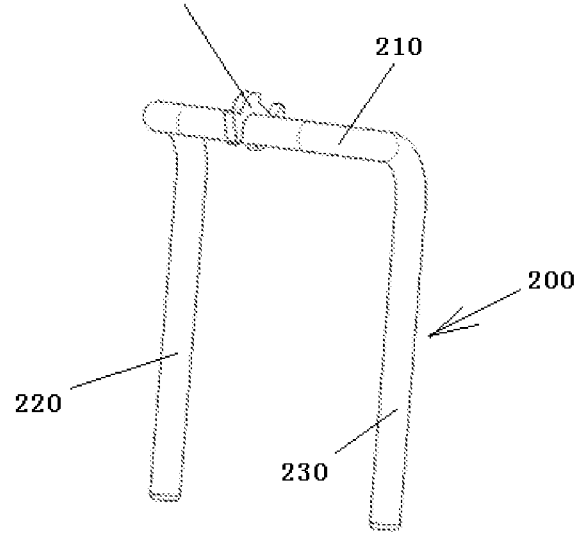
FIG. 19 is a schematic diagram of assembly of the fixed tooth in the turnable headrest and a horizontal rod in a headrest rod according to the present invention.
Figure 20:
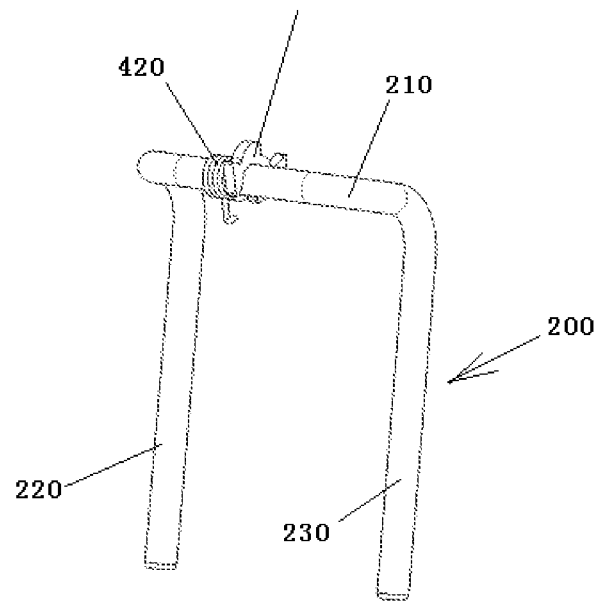
FIG. 20 is a schematic diagram of the fixed tooth, the torsion spring, and the horizontal rod in the headrest rod in the turnable headrest viewed from one direction after assembled according to the present invention.
Figure 21:
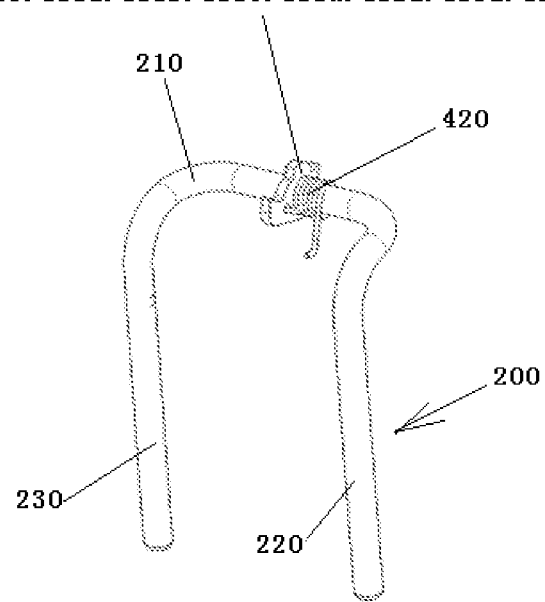
FIG. 21 is a schematic diagram of the fixed tooth, the torsion spring, and the horizontal rod in the headrest rod in the turnable headrest viewed from another direction after assembled according to the present invention.
Figure 22:
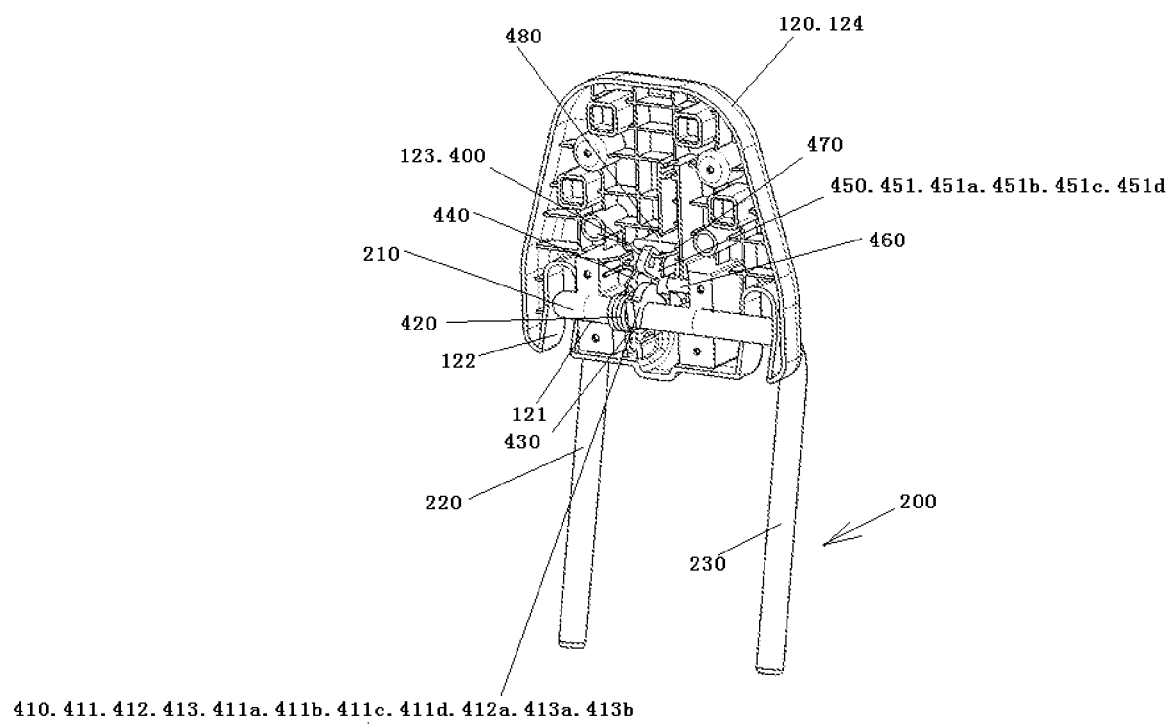
FIG. 22 is a schematic exploded view of the turnable headrest viewed from one direction after a front half of the headrest is removed according to the present invention.
Figure 23:
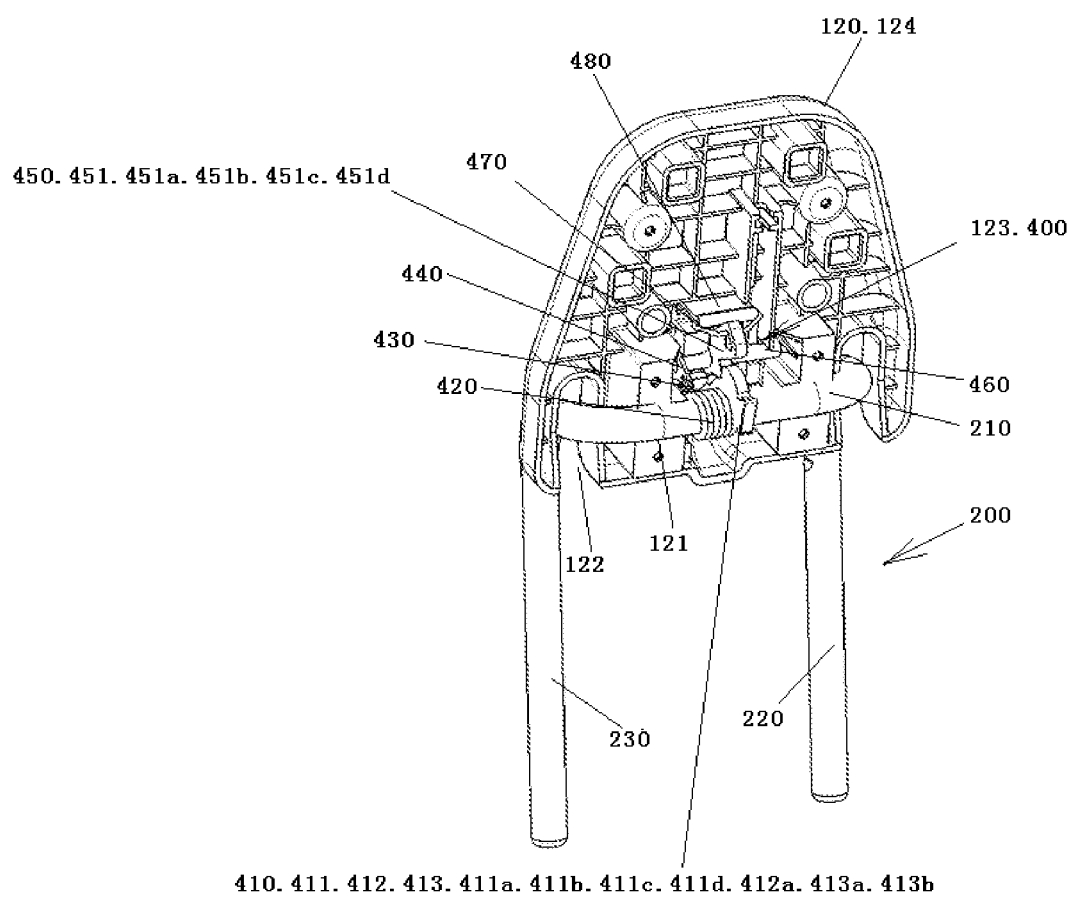
FIG. 23 is a schematic exploded view of the turnable headrest viewed from another direction after a front half of the headrest is removed according to the present invention.
Figure 24:
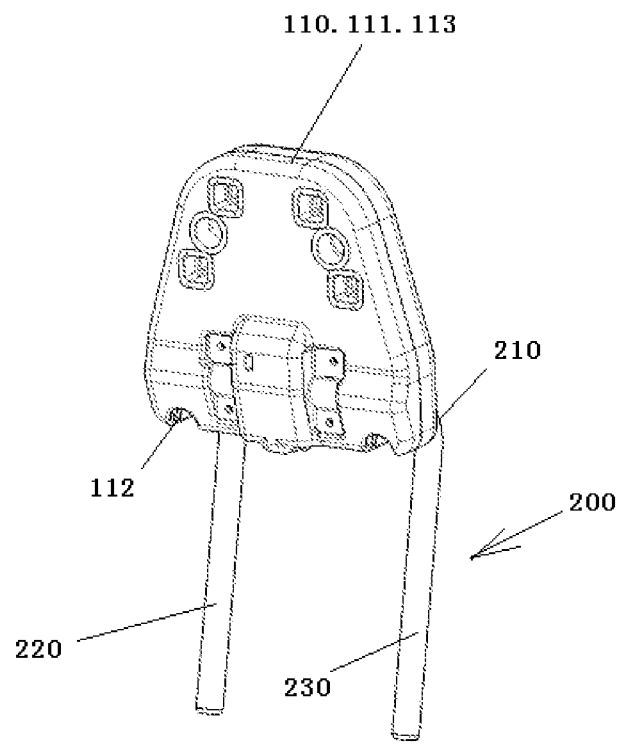
FIG. 24 is a schematic exploded view of the turnable headrest viewed from still another direction after a front half of the headrest is removed according to the present invention.
Figure 25:
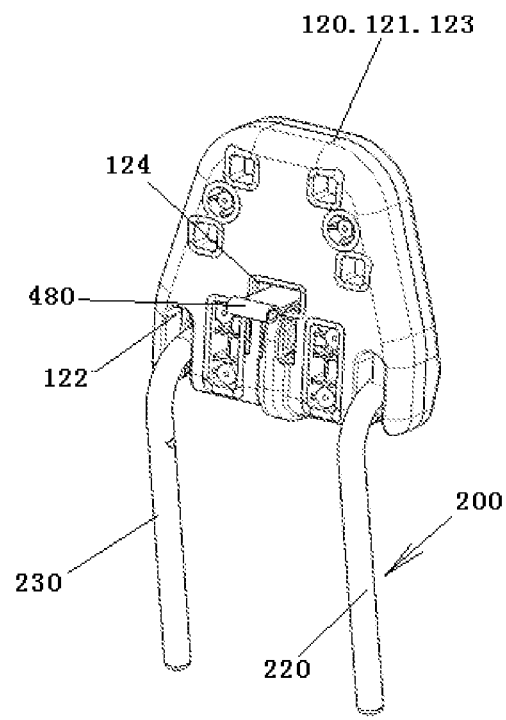
FIG. 25 is a schematic exploded view of the turnable headrest viewed from yet another direction after a front half of the headrest is removed according to the present invention.
Figure 26:
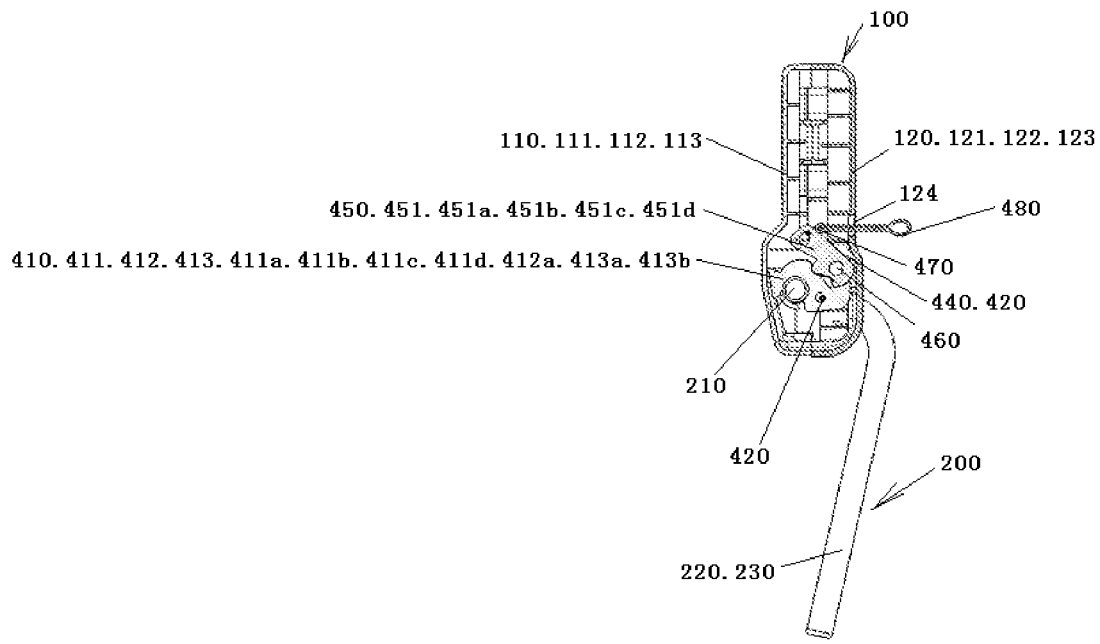
FIG. 26 is a schematic diagram of an internal structure of the turnable headrest in normal use according to the present invention.
Figure 27:
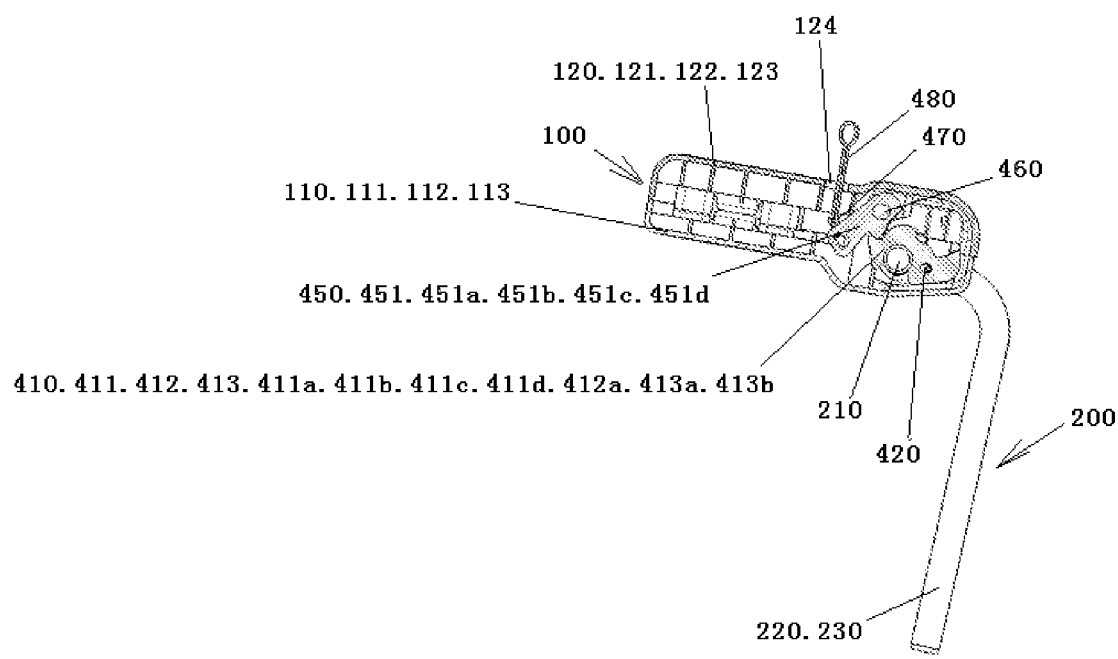
FIG. 27 is a schematic diagram of an internal structure of the turnable headrest turned completely flat according to the present invention.

Especially referring to FIG. 18 to FIG. 20, the fixed tooth 410 and the torsion spring 420 are sleeved on the horizontal rod 210, where the fixed tooth 410 is connected to the horizontal rod 210 by means of welding. One end of the torsion spring 420 acts on the fixed tooth 410, and an other end of the torsion spring acts on the rear half 120 of the headrest of the headrest body 100. The role of the torsion spring 420 is to reset the headrest body 100.

The rotary shaft 460 is located in a half cavity 129, and the two ends of the rotary shaft are axially disposed on the rear half 120 of the headrest. Especially referring to FIG. 16, the unlocking handle 440 and the rotary tooth 450 are welded on the rotary shaft 460.

One end of the reset tension spring 430 is hooked to the unlocking handle 440, and an other end of the reset tension spring is hooked to the rear half 120 of the headrest. One end of the unlocking pull strap 480 is connected to the rotary tooth 450 by using the steel wire pull ring 470. An unlocking pull strap extension hole 124 is further formed on the rear half 120 of the headrest, and an other end of the unlocking pull strap 480 extends out of the rear half 120 of the headrest through the unlocking pull strap extension hole 124. By pulling the unlocking pull strap 480, the rotary tooth 450 and the rotary shaft 460 may be driven to rotate for unlocking. During the unlocking, the reset tension spring 430 stretches to store energy. The unlocking pull strap 480 is loosened, so that the reset tension spring 430 can rotate in a reverse direction by using the rotary shaft 460 to cause the rotary tooth 450 to return to a locked state.

The present invention is characterized in that a headrest body locking portion 411 is provided on the fixed tooth 410, a headrest body rotary tooth portion 412, and a turned headrest body locking portion 413. The headrest body rotary tooth portion 412 is located between the headrest body locking portion 411 and the turned headrest body locking portion 413. In addition, a rotary tooth portion 451 is disposed on the rotary tooth 450.

Especially referring to FIG. 8 to FIG. 15, when the rotary tooth portion 451 is mated with the headrest body locking portion 411 on the fixed tooth 410, the headrest body 100 is locked at an initial use position. When the rotary tooth portion 451 is mated with the headrest body rotary tooth portion 412 on the fixed tooth 410, the headrest body 100 is at a turnable position. When the rotary tooth portion 451 is mated with the turned headrest body locking portion 413 on the fixed tooth 410, the headrest body 100 is locked at a flat position.

The headrest body locking portion 411 is formed by a sector-shaped notch. The sector-shaped notch is formed by a convex circular arc 411a and a first locking straight side 411b and a locking concave arc side 411c that are located on two ends of the convex circular arc 411a. The first locking straight side 411b is adjacent to the headrest body rotary tooth portion 412, and the first locking straight side 411b and the locking concave arc side 411c form a first locking concave corner 411d.

The headrest body rotary tooth portion 412 is formed by a convex circular arc 412a, and one end of the convex circular arc 412a is connected to the first locking straight side 411b.

The turned headrest body locking portion 413 is formed by a second locking concave corner 413b formed by a straight side 413a and an other end of the convex circular arc 412a.

The rotary tooth portion 451 is composed of a first locking arc 451a, a slidably mated concave arc 451b, and a second locking arc 451c. One end of the first locking arc 451a is connected to one end of the slidably mated concave arc 451b, and the second locking arc 451c is connected to an other end of the slidably mated concave arc 451b and forms a locking convex corner 451d with an other end of the slidably mated concave arc 451b.

Figure 8:
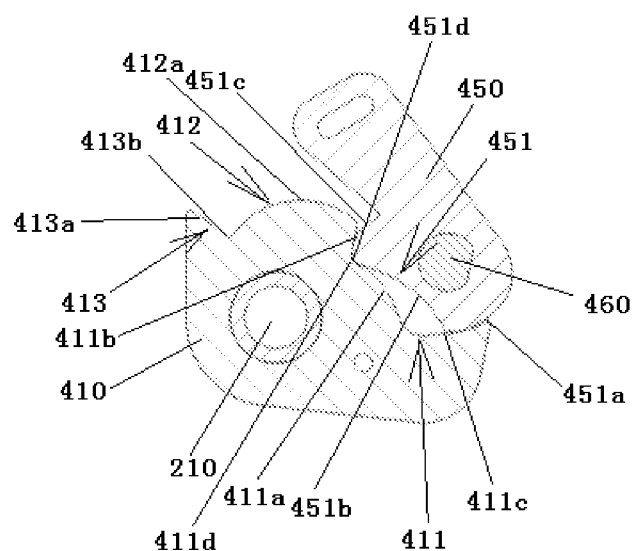
FIG. 8 is a schematic diagram of a positional relationship between a rotary tooth and a fixed tooth when the turnable headrest is in normal use according to the present invention.
Figure 12:
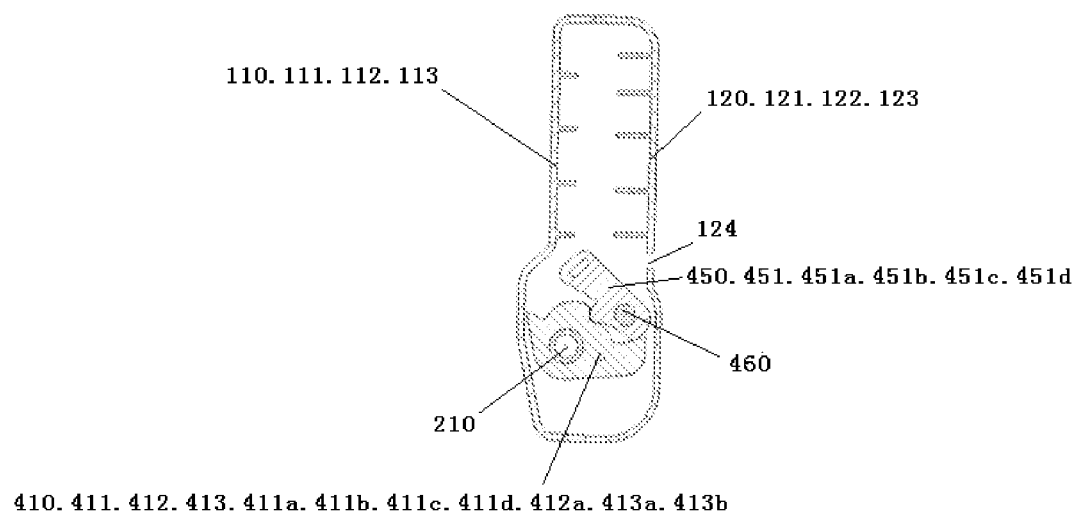
FIG. 12 is a schematic diagram of an interior of the turnable headrest in normal use according to the present invention.

Especially referring to FIG. 8 and FIG. 12, when the headrest body 100 is locked in a use state, the locking convex corner 451d in the rotary tooth portion 451 is inserted into the first locking concave corner 411d in the headrest body locking portion 411, the second locking arc 451c is in locked contact with the first locking straight side 411b, and the first locking arc 451a is in locked contact with the locking concave arc side 411c.

Figure 9:
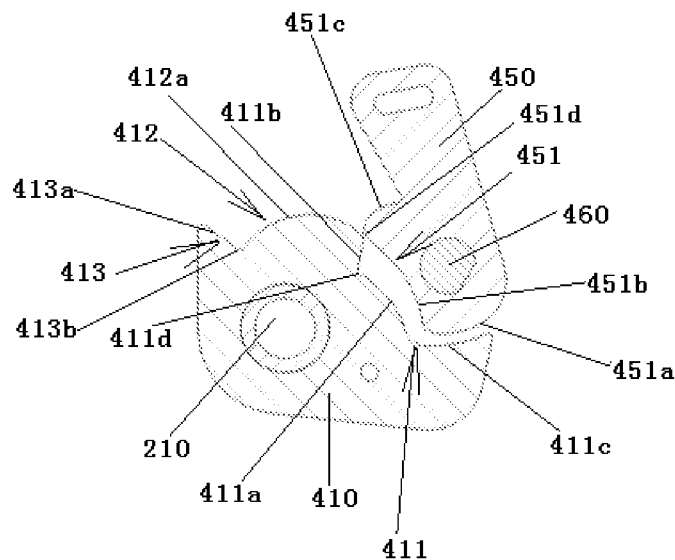
FIG. 9 is a schematic diagram of a positional relationship between a rotary tooth and the fixed tooth when the turnable headrest is in an unlocked state according to the present invention.
Figure 13:
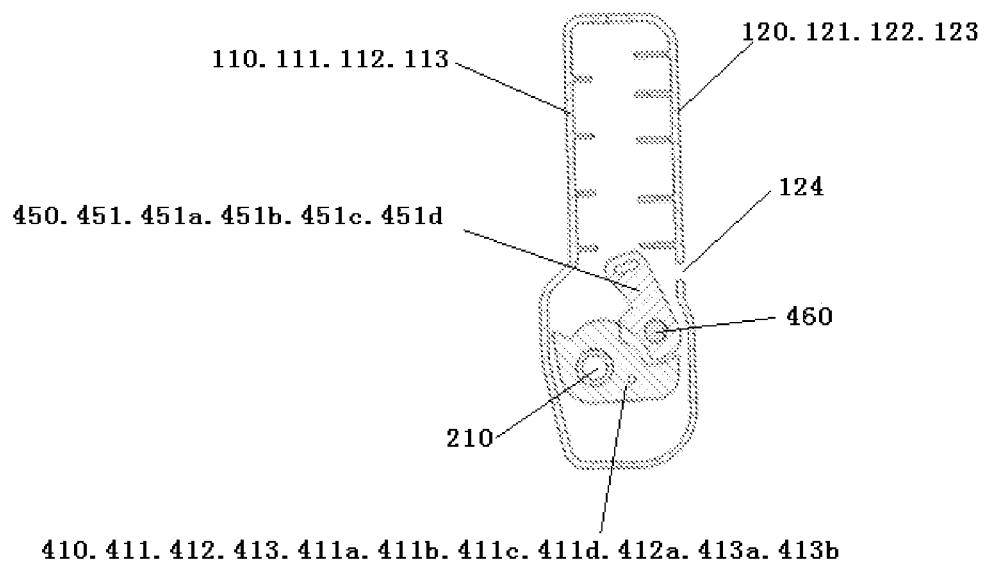
FIG. 13 is a schematic diagram of an interior of the turnable headrest in an unlocked state according to the present invention.

Especially referring to FIG. 9 and FIG. 13, when the unlocking pull strap 480 pulls the rotary tooth 450 to unlock, the locking convex corner 451d in the rotary tooth portion 451 gradually escapes from the first locking concave corner 411d in the headrest body locking portion 411 until complete escape, the second locking arc 451c gradually escapes from the locked contact with the first locking straight side 411b until complete escape from the locked contact, and the first locking arc 451a gradually escapes from the locked contact with the locking concave arc side 411c until complete escape from the locked contact.

Figure 10:
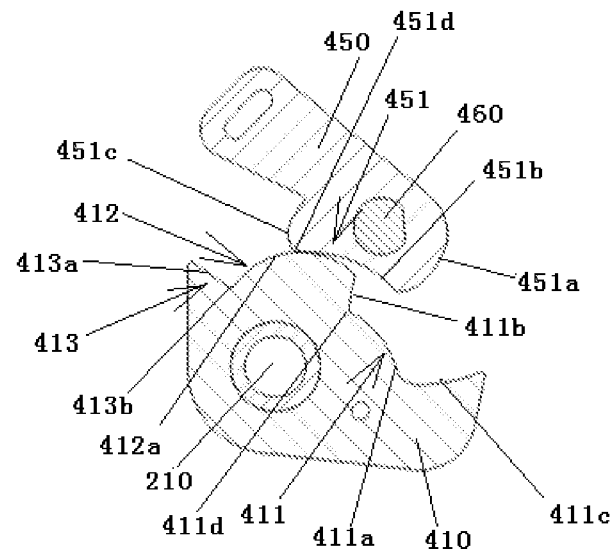
FIG. 10 is a schematic diagram of a positional relationship between the rotary tooth and the fixed tooth when the turnable headrest is in a turned state according to the present invention.
Figure 14:
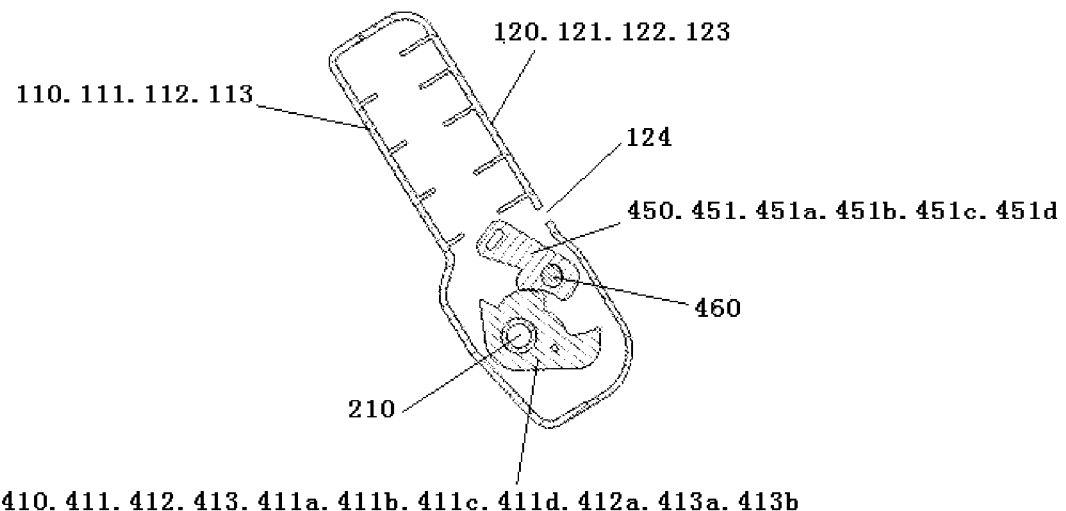
FIG. 14 is a schematic diagram of an interior of the turnable headrest in a turned state according to the present invention.

Especially referring to FIG. 10 and FIG. 14, during the turning of the headrest body 100, the slidably mated concave arc 451b on the rotary tooth 450 is in slidable contact with the convex circular arc 412a in the headrest body rotary tooth portion 412.

Figure 11:
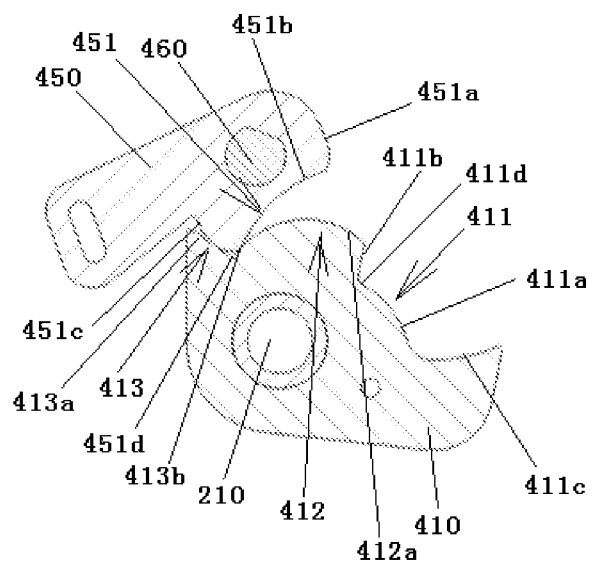
FIG. 11 is a schematic diagram of a positional relationship between the rotary tooth and the fixed tooth when the turnable headrest is turned completely flat according to the present invention.
Figure 15:
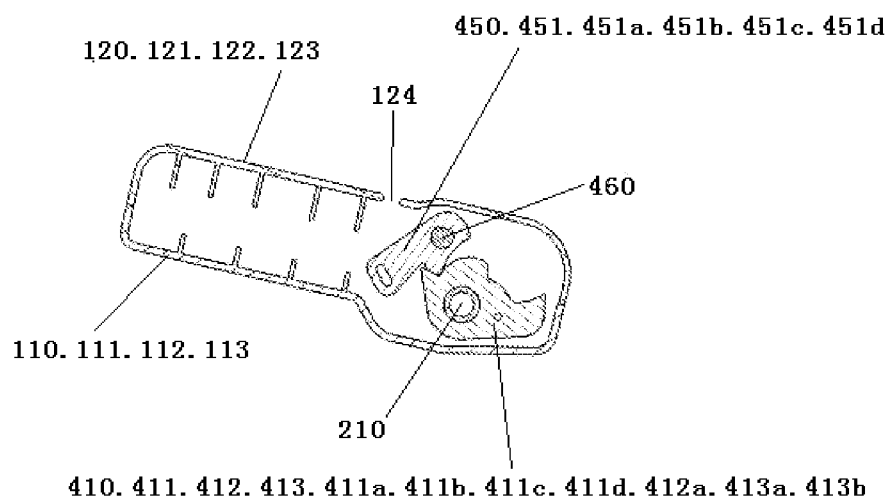
FIG. 15 is a schematic diagram of an interior of the turnable headrest turned completely flat according to the present invention.
Figure 16:
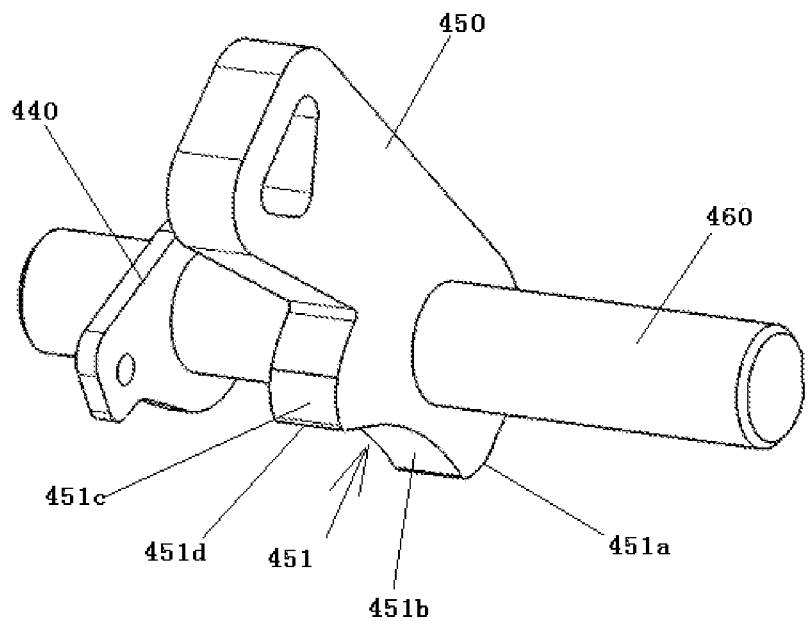
FIG. 16 is a schematic diagram of assembly between an unlocking piece, a rotary tooth, and a rotary shaft in the turnable headrest according to the present invention.
Figure 17:
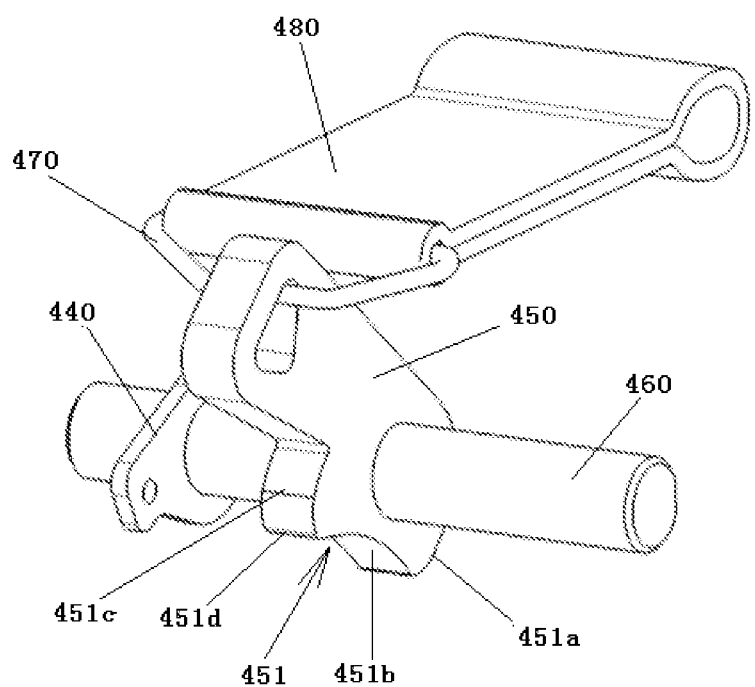
FIG. 17 is a schematic diagram of the assembly between an unlocking piece, a rotary tooth, a rotary shaft, and an unlocking pull strap in the turnable headrest according to the present invention.

Especially referring to FIG. 11 and FIG. 15, after the headrest body 100 is turned completely flat, the locking convex corner 451d in the rotary tooth portion 451 is inserted into the second locking concave corner 413b in the turned headrest body locking portion 413, and the second locking arc 451c in the rotary tooth portion 451 is in locked contact with the straight side 413a in the turned headrest body locking portion 413.

When the headrest body 100 needs to return to the use state after being turned completely flat, the unlocking pull strap 480 is first used for pulling the rotary tooth 450 to unlock, the locking convex corner 451d in the rotary tooth portion 451 gradually escapes from the second locking concave corner 413b in the turned headrest body locking portion 413 until complete escape, and the second locking arc 451c in the rotary tooth portion 451 gradually escapes from the locked contact with the straight side 413a in the turned headrest body locking portion 413 until complete escape from the locked contact. Then the torsion spring 420 drives the headrest body 100 to reversely turn to the initial use state.

In the above movement process, the reset tension spring 430 drives the rotary shaft 460 to always maintain a torsion force in an initial moving direction by using the unlocking handle 440, and pushes the rotary tooth portion 451 on the rotary tooth 450 by using the rotary shaft 460 such that a specific contact pressure always exists between the rotary tooth portion on the rotary tooth and the headrest body locking portion 411, the headrest body rotary tooth portion 412, and the turned headrest body locking portion 413 on the fixed tooth 410, so as to enhance the self-locking ability and eliminate noise of the headrest body 100 during turning.

The unlocking pull strap 480 may be also replaced by other unlocking mechanisms, as long as it can drive the rotary tooth 450 to rotate, for example, unlocking inhaul cables or unlocking buttons shall fall within the protection scope of the present invention.

In addition, the headrest turning and locking-unlocking mechanism 400 may further perform some other changes, and the reset tension spring 430 may be replaced by using some other elastic reset elements such as compressed springs and elastic rubber, to directly act on the rotary tooth 450. Meanwhile, the rotary shaft 460 and the unlocking handle 440 may be removed as well, and the rotary tooth 450 may be directly axially disposed on the rear half 120 of the headrest.

The turnable headrest of the present invention has advantages such as a small quantity of parts, a simple structure, and low costs.

What is claimed is:

1. A turnable headrest, comprising a headrest body and a headrest rod, wherein the headrest body is wrapped around and hinged to a horizontal rod of the headrest rod, and two vertical rods of the headrest rod are inserted into a seat, the turnable headrest further comprising:

a fixed tooth, fixed to the horizontal rod of the headrest rod and located in the headrest body, wherein a headrest body locking portion, a headrest body rotary tooth portion, and a turned headrest body locking portion are disposed on the fixed tooth;

a torsion spring, sleeved on the horizontal rod of the headrest rod and located in the headrest body, wherein one end of the torsion spring acts on the fixed tooth, and another end of the torsion spring acts on the headrest body;

a rotary tooth, axially disposed in the headrest body, wherein the rotary tooth has a rotary tooth portion, when the rotary tooth portion is mated with the headrest body locking portion on the fixed tooth, the headrest body is locked at an initial use position, when the rotary tooth portion is mated with the headrest body rotary tooth portion on the fixed tooth, the headrest body is at a turnable position, and when the rotary tooth portion is mated with the turned headrest body locking portion on the fixed tooth, the headrest body is locked at a flat position; and an elastic reset element, wherein one end of the elastic reset element acts on the rotary tooth, another end of the elastic reset element acts on the headrest body, and the elastic reset element is configured to push the rotary tooth portion on the rotary tooth such that a specific contact pressure always exists between the rotary tooth portion on the rotary tooth and the headrest body locking portion, the headrest body rotary tooth portion, and the turned headrest body locking portion on the fixed tooth;

wherein the fixed tooth comprises a sector-shaped notch, the sector-shaped notch is formed by a first fixed tooth convex circular arc and a first locking straight side and a locking concave arc side that are located on two ends of the first fixed tooth convex circular arc, the first locking straight side is adjacent to the rotary tooth portion of the fixed tooth, the first locking straight side and the first fixed tooth convex circular arc form a first locking concave corner, the rotary tooth portion of the fixed tooth is formed by a second convex circular arc, one end of the second convex circular arc is connected to the first locking straight side, the turned headrest body locking portion is formed by a second locking concave corner formed by another straight side and another end of the second convex circular arc, the rotary tooth portion of the rotary tooth is composed of a first locking arc, a slidably mated concave arc, and a second locking arc, one end of the first locking arc is connected to one end of the slidably mated concave arc, and the second locking arc is connected to another end of the slidably mated concave arc to form a locking convex corner with the other end of the slidably mated concave arc, wherein, when the rotary tooth portion is mated with the locking portion on the fixed tooth, the first locking arc and the second locking arc of the rotary tooth abut the locking concave arc side and the first locking straight side of the sector-shaped notch on the fixed tooth, respectively.

2. The turnable headrest according to claim 1, wherein the headrest body rotary tooth portion is located between the headrest body locking portion and the turned headrest body locking portion.

3. The turnable headrest according to claim 1,
when the headrest body is locked in a use state, the locking convex corner in the rotary tooth portion is inserted into the first locking concave corner in the headrest body locking portion;
when the rotary tooth is unlocked, the locking convex corner in the rotary tooth portion gradually escapes from the first locking concave corner in the headrest body locking portion until complete escape, the second locking arc gradually escapes from the locked contact with the first locking straight side until complete escape from the locked contact, and the first locking arc gradually escapes from the locked contact with the locking concave arc side until complete escape from the locked contact;
during the turning of the headrest body, the slidably mated concave arc on the rotary tooth is in slidable contact with the second convex circular arc in the rotary tooth portion of the fixed tooth;
after the headrest body is turned completely flat, the locking convex corner in the rotary tooth portion is inserted into the second locking concave corner in the turned headrest body locking portion, and the second locking arc in the rotary tooth portion is in locked contact with the straight side in the turned headrest body locking portion; and
when the headrest body needs to return to the use state after being turned completely flat, the rotary tooth is first unlocked, the locking convex corner in the rotary tooth portion gradually escapes from the second locking concave corner in the turned headrest body locking portion until complete escape, and the second locking arc in the rotary tooth portion gradually escapes from the locked contact with the straight side in the turned headrest body locking portion until complete escape from the locked contact.

4. The turnable headrest according to claim 1 or 2, further comprising a rotary shaft disposed in the headrest body, and the rotary tooth is fixed on the rotary shaft.

5. The turnable headrest according to claim 4, further comprising an unlocking handle fixed to the rotary shaft, wherein the elastic reset element is a reset tension spring, one end of the reset tension spring acts on the unlocking handle, another end of the reset tension spring acts on the headrest body and indirectly acts on the rotary tooth by using the unlocking handle and the rotary shaft, and the reset tension spring drives, by using the unlocking handle and the rotary shaft, the rotary tooth to rotate.

6. The turnable headrest according to claim 1, further comprising an unlocking mechanism configured to drive the rotary tooth to rotate for unlocking.

7. The turnable headrest according to claim 6, wherein the unlocking mechanism is an unlocking pull strap, one end of the unlocking pull strap is connected to the rotary tooth, and another end of the unlocking pull strap extends out from a proper position of the headrest body, wherein by pulling the unlocking pull strap to rotate, the rotary tooth is driven for unlocking.

8. The turnable headrest according to claim 7, wherein the headrest body is formed by a front half of the headrest and a rear half of the headrest, an unlocking pull strap extension hole is formed on the rear half of the headrest, and the unlocking pull strap extends out of the rear half of the headrest through the unlocking pull strap extension hole.

* * * * *